United States Patent [19]

Ohle et al.

[11] Patent Number: 4,932,581
[45] Date of Patent: Jun. 12, 1990

[54] METHOD OF AND DEVICE FOR METERING A SOLDER MATERIAL IN A SOLDERING DEVICE

[75] Inventors: Eckhard Ohle, Stuttgart; Wilfried Reschnar, Schozach, both of Fed. Rep. of Germany

[73] Assignee: Robert Bosch GmbH, Stuttgart, Fed. Rep. of Germany

[21] Appl. No.: 347,945

[22] PCT Filed: Jul. 20, 1988

[86] PCT No.: PCT/DE88/00450

§ 371 Date: Apr. 4, 1989

§ 102(e) Date: Apr. 4, 1989

[87] PCT Pub. No.: WO89/01379

PCT Pub. Date: Feb. 23, 1989

[30] Foreign Application Priority Data

Aug. 17, 1987 [DE] Fed. Rep. of Germany ....... 3727343

[51] Int. Cl.⁵ .............................................. B23K 3/06
[52] U.S. Cl. ...................................... 228/102; 226/43; 226/45; 228/41
[58] Field of Search .......................... 228/41, 8, 9, 102; 226/42, 45, 115, 43

[56] References Cited

U.S. PATENT DOCUMENTS

| | | | |
|---|---|---|---|
| 3,830,420 | 8/1974 | Milana | 228/41 |
| 3,940,046 | 2/1976 | Fern | 228/8 |
| 4,107,508 | 8/1978 | Izumi et al. | 219/137.7 |
| 4,530,456 | 7/1985 | Michelotti | 228/9 |

FOREIGN PATENT DOCUMENTS

| | | |
|---|---|---|
| 32858 | 4/1983 | Fed. Rep. of Germany . |
| 3312421 | 10/1984 | Fed. Rep. of Germany . |
| 3404945 | 8/1985 | Fed. Rep. of Germany . |
| 56-481 | 4/1981 | Japan . |

*Primary Examiner*—Kenneth J. Ramsey
*Attorney, Agent, or Firm*—Michael J. Striker

[57] ABSTRACT

A method of and a device for metering a solder wire to a solder location in which an electric motor for driving solder wire feed means supported on a carriage of a solder wire metering device is actuated to provide for feeding a predetermined length of the solder wire to a soldering location, a magnitude of a mechanical feed force applied to the solder wire is controlled in proportion to a magnitude of a contact pressure force acting on an end of the solder wire at the soldering location, and the electric motor is stopped after the predetermined length of the solder wire has been melted.

19 Claims, 3 Drawing Sheets

METHOD OF AND DEVICE FOR METERING A SOLDER MATERIAL IN A SOLDERING DEVICE

BACKGROUND OF THE INVENTION

The invention relates to a method of and a device for metering quantity of solder material by an automatic forward feed of a predetermined length of a solder wire to be melted in a soldering device. A soldering device with automatic forward feed of a predetermined length of a solder wire to be melted at the soldering location during every soldering process is already known from the DE-OS 24 27 390 (U.S. Pat. No. 3,830,420). In particular, this device comprises a carriage which can be moved toward and away from a soldering location by a drive motor. An electromechanically controlled wire forward feed device is arranged at the carriage. A control system with object feeling switches for the drive motor of the carriage ensures that the carriage arrives in its soldering position. A predetermined length of solder wire to be melted is then fed to a heated soldering location, and the carriage is returned after the soldering of the solder wire is accomplished. Accordingly, it is ensured that the device works in an automatically controlled time sequence, wherein the same quantity of solder wire is always fed to the soldering location during every soldering process. The nature of the solder wire employed, i.e. its thickness, material composition, melting capability and the like, is not taken into account in the known device.

SUMMARY OF THE INVENTION

The object of the invention is to provide a method of metering a quantity of a solder wire in which a maximum uniform soldering quality can be maintained accurately in a simple manner, even when one or more soldering parameters change or disturbing influences occur. Such disturbance factors are e.g. temperature changes in the heat source resulting from current fluctuations, impurities or, when using gas burners, from changes in the slow rate of gas. The soldering parameters which can change are particularly the size, material and mass of the parts to be soldered together, their initial temperature, and the composition and thickness of the solder wire. As a result of all of these components, the soldering time changes, i.e. the time span required by a given quantity of solder wire in order to melt after placement on the soldering location. The proposed method automatically compensates for heating errors by regulating the forward feed force or the forward feed speed of the solder wire and, in this way, moreover, prevents a bending of the end of the solder wire when placed in the soldering location. This regulation of melting of the solder wire in a manner which is sensitive to force is particularly important when using very soft and/or very thin solder wires for fine soldering. The described characteristics make a soldering device constructed according to the method of the invention, particularly suitable for use in automatic soldering stations in which the device is arranged in a programmable manipulator. Moreover, it must be mentioned that the proposed method requires no additional feelers for detecting the temperature at the soldering location. This makes it possible to build particularly reliable and sturdy automatic soldering machines.

Particularly simple and accurate regulation of force can be achieved by converting the magnitude of the contact pressure force occurring at the end of the solder wire into proportional electric signals which are supplied as actual values to a regulating circuit which determines the speed of an electric motor for the forward feed of the solder wire. In order to obtain a control which is as sensitive as possible during the forward feed as well as during placement and melting of the solder wire, it is further proposed that the weighting of the electric signal derived from the contact pressure force occurring at the end of the solder wire be variable. A further improvement consists in that the weight factor of the parts of the soldering device which participate in determining the contact pressure force of the solder wire is eliminated before every soldering cycle by balancing means. The value of the remaining measurement signal accordingly depends only on the contact pressure force occurring at the end of the solder wire.

The present invention as to its construction so to its mode of operation, together with additional objects and advantages thereof, will be best understood from the following description of preferred embodiments with reference to appended drawings.

DESCRIPTION OF THE PREFERRED EMBODIMENTS

Figure 1:
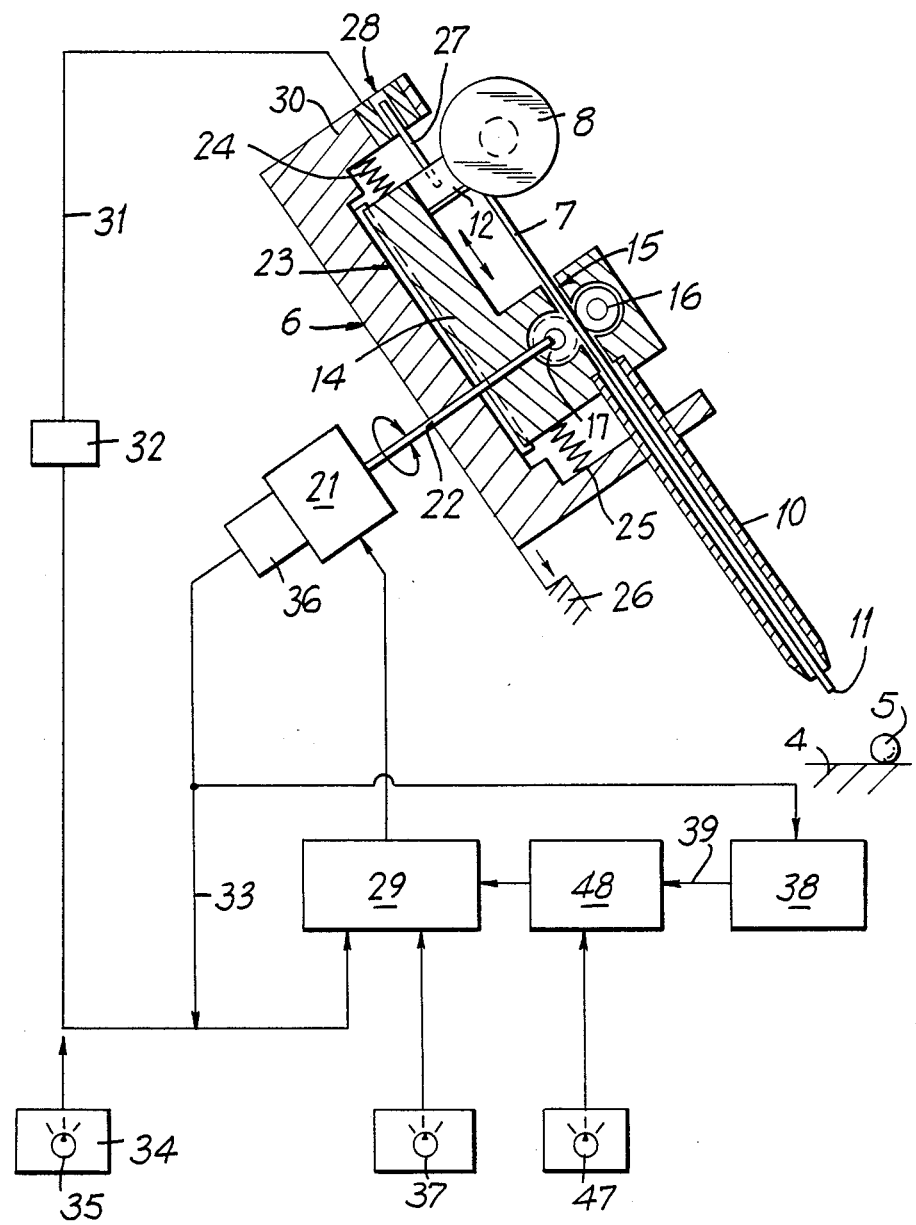
FIG. 1 shows schematically a first embodiment of a device for implementing the method of the invention in connection with a block wiring diagram.

The soldering device shown in the drawing has a heating source in the form of a soldering iron 2 which is arranged in a holder 1 so as to be exchangeable. Instead of such a soldering iron, another heat source, e.g. a gas burner or a laser, can also be used. The soldering tip 3 of the soldering iron 2 is aligned with a wire 5 to be soldered at a workpiece 4. The workpiece 4 and the wire 5 define a soldering location.

Figure 2:
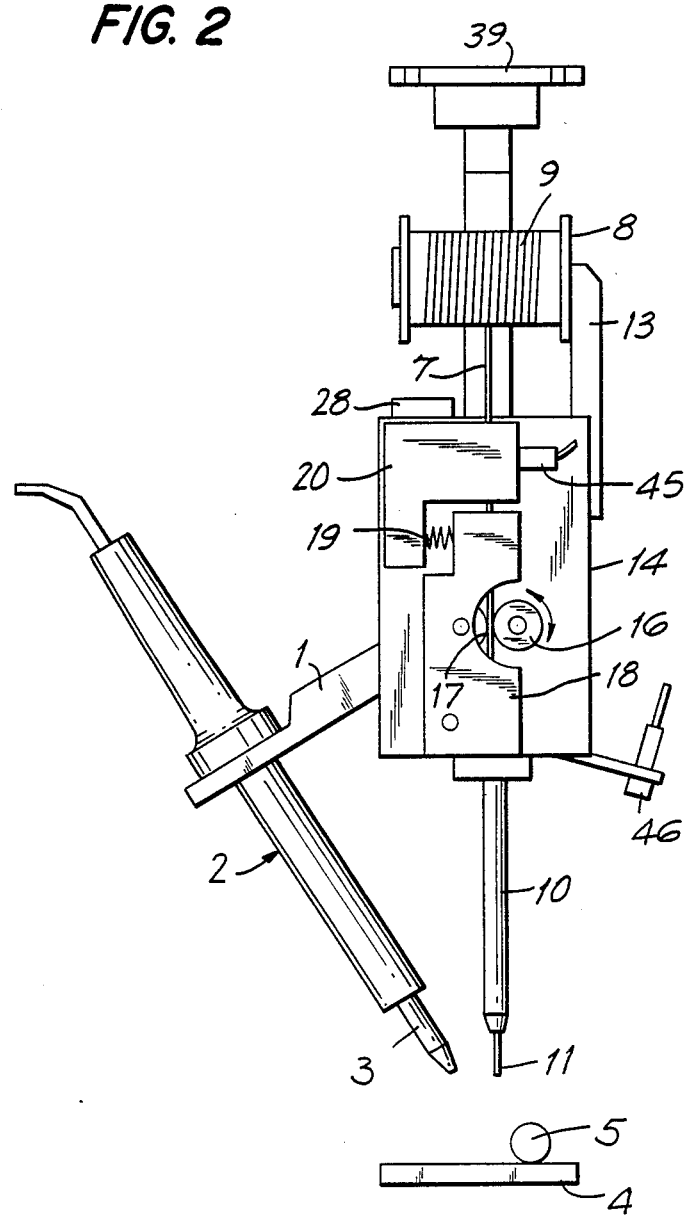
FIG. 2 shows a modified embodiment of the soldering device which can be attached to a manipulator.
Figure 3:
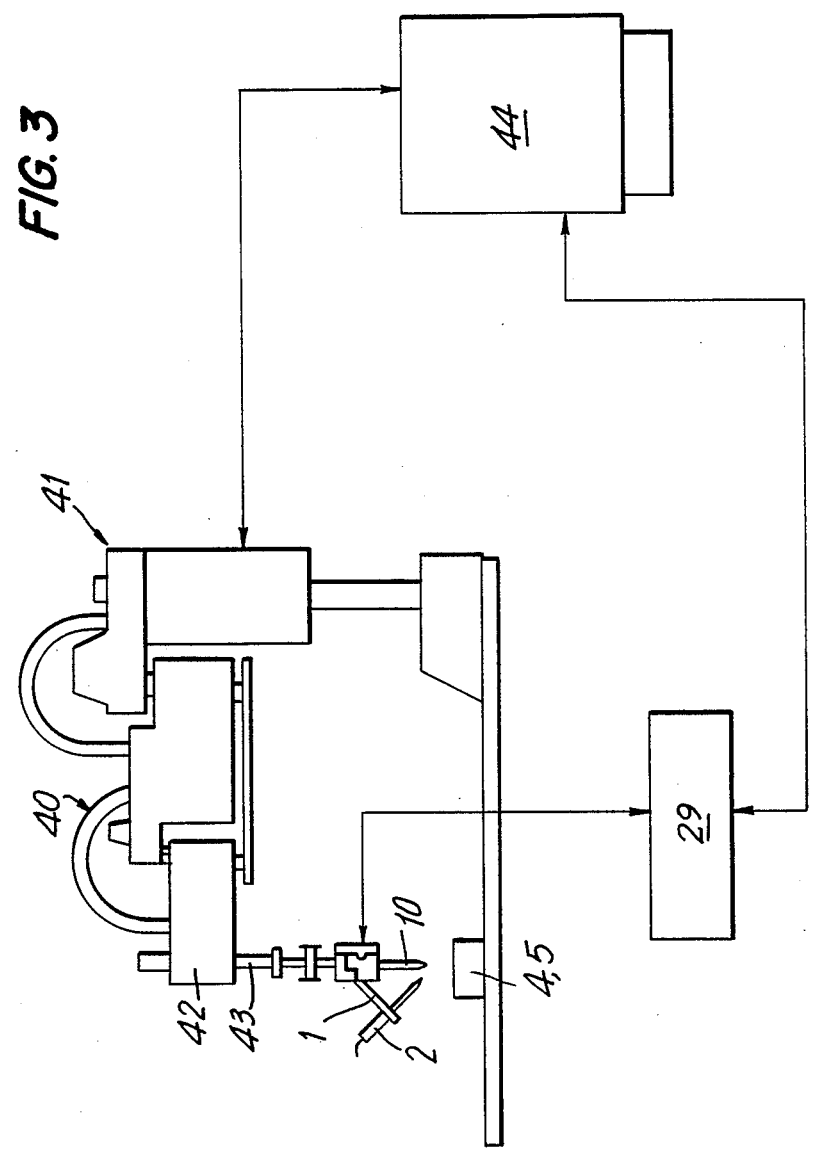
FIG. 3 shows schematically a manipulator equipped with a control having a programmable memory and the soldering device according to FIG. 2.

The holder 1 is pivotally supported in a carrier 6 (FIG. 1) described in more detail in the following, so as to be adjustable between the soldering position shown in FIGS. 2 and 3 and a cleaning position for the soldering tip 3. The solder wire 7 is coiled onto a coil 9 located on a spool 8 and passes through a guide tube 10 which is arranged in such a way that the end 11 of the solder wire 7 projecting out of the tube 10 is aligned with the soldering location 4, 5. The coil 8 is supported on an arm 12 (FIG. 1) and 13 (FIG. 2), respectively, of a carriage 14. The solder wire guide tube 10 is fastened at the end of the carriage 14 facing the soldering location 4, 5. A solder wire forward feed device is arranged between the coil 9 and the guide tube 10 in the area of a bore 15 formed in the carriage 14. This solder wire forward feed device preferably has grooved friction rollers 16, 17 between which the solder wire 7 is guided. The roller 16 is supported at the carriage 14. The axis of rotation of the friction roller 17 is arranged on a plate 18 which is pivotally supported on the carriage 14, as can be seen from FIG. 1. A spring 19, which is supported at a part 20 of the carriage 14 and at the plate 18, presses the friction roller 17 in the direction of the friction roller 16, so that the solder wire 7 is clamped between the two rollers in a friction-locking manner. An electric motor 21, whose rotational direction is reversible, serves for the forward feed of the solder wire 7. The drive force of the motor is transmitted to the friction roller 17 via a shaft 22. The motor 21 is arrange on the carriage 14, as is the solder wire coil 9 wound on the spool 8.

The carriage 14 is arranged in a sliding guide 23, e.g. a dovetail guide, so as to be movable in the carrier 6 in the direction of the soldering location 4, 5. This guide absorbs all forces which do not occur in the direction of the solder wire forward feed. The carriage 14 is held in the initial position with respect to the carrier 6 by two pressure springs 24, 25 which act against one another and are supported at an end face of the carriage and at the carrier 6 in each instance. The latter is movable from the initial position shown in FIG. 1 in the direction of the soldering location 4, 5 until reaching a soldering position allowed by a stop 26 which is stationary with respect to the device. The forward feed and pulling back of the carrier 6 is effected by a mechanical drive, not shown, which preferably acts pneumatically. Instead of the movable carrier 6, a carrier which is stationary with respect to the device could also be used, and, instead of the latter, a carrier of the soldering location 4, 5 could be arranged so as to be movable between an initial position and a soldering position.

As can be seen from FIG. 1, a movable part 27 of an electric transducer 28 is assigned to the carriage 14. The part 27 responds to relative movements of the carriage 14 with respect to the carrier 6 and produces a signal proportional to the magnitude of the movement path of the carriage and a rigidity of the two springs 24 and 25, which signal is fed to the speed regulating circuit 29 of the electric motor 21. An inductive system can be used as a transducer, for example.

The signal which is proportional to the force is electronically balanced by means of the circuit 32 located in the line 31 before implementing a soldering cycle. Influences of mass and inclined position of the forward feed unit and the weight of the solder wire coil are accordingly eliminated.

Such balancing circuits are known per se and therefore need not be discussed in more detail here. The magnitude of the remaining signal fed to the regulating circuit 29 of the electric motor 21 accordingly depends only on the magnitude of a force exerted on the end 11 of the solder wire against its forward feed direction.

In addition, a weighting circuit 34 for the force-dependent signal produced by the transducer 28, which weighting circuit 34 can be set to different values, is connected to the line 33. The magnitude of the signal voltage can be changed by a correcting element 35 of the circuit 34, e.g. as a function of the material and the thickness of the employed solder wire. The more sensitive the solder wire 7 is, the greater is the weighting of the signal, and vice versa.

A tacho-generator 36 is mounted on the drive shaft 22 of the motor 21 as speed-dependent signal transmitter. The signal supplied by it, which is proportional to the magnitude of the speed, is fed into the line 31 via a line 33. The actual value of the electric signal fed to the speed regulating circuit 29 of the motor 21 is $E = FK + V$, wherein F is the value of the force-dependent signal supplied by the transducer after balancing, K is its weighting, and V is the value of the speed-dependent signal. In the regulating circuit 29, the actual value is compared with a set value and the speed of the motor 21 is then regulated. The magnitude of the set value can be adjusted by a correcting element 37. In addition, the line 33 leads to a path-oriented solder quantity measurement circuit 38 in which the tacho-generator signal is added. The signal at the output 39 of the measurement circuit 38 is compared in the comparator 48 with the set value of "solder quantity", which can be set with a correcting element 47. The comparator 48 turns off the motor 21 via the regulator 29 when the set value is reached.

The manner of operation of the device, with reference to FIG. 1, is as follows:

After a soldering cycle is triggered, the signal coming from the transducer 28 is first balanced in the balancing circuit 32, and the carrier 6 is moved mechanically into its soldering position which is determined by the stop 26. Next, the electric motor 21 is turned on via the regulating circuit 29 for the purpose of advancing the solder wire 7 forward by the friction rollers 16, 17. During this, the carriage 14 maintains unchanged its initial position at the carrier 6, the initial position being determined by the springs 24, 25, since no counterforce acts at first on the end 11 of the solder wire. The signal which is supplied by the transducer 28 and purged of the respective carriage weight factor remains constant and is preferably zero. Therefore, only the signal supplied by the tacho-generator 36 is first applied at the actual value input of the regulating circuit 29. The solder wire 7 is displaced at a constant speed until the end 11 of the solder wire strikes the soldering location 4, 5. If the soldering location is still cold or is heated only moderately by the heating source, a counterforce occurs when the end 11 of the solder wire is placed at the soldering location 4, 5, which counterforce is transmitted to the carriage 14 by the friction rollers 16, 17 and pushes this carriage 14 upward against the force of the spring 24 a determined amount. This movement is converted by the transducer 28 into a signal which is proportional to the forward feed force exerted on the solder wire 7. Accordingly, the transducer supplies a suddenly climbing actual value signal via the line 31 when the end of the solder wire strikes the soldering location 4, 5. The speed of the motor 21 decreases to zero or even becomes negative, wherein it is assumed that the weighted signal supplied by the transducer 28 is equal to or greater than the set value signal in the regulating circuit.

The increase in the measurement signal from the transducer 28 during the impact of the end 11 of the solder wire on the soldering location 4, 5 can be used for activating the measurement circuit 38 for the quantity of solder wire, which turns off the motor with the aid of the comparator 48 after the soldering location is heated and a given length of the solder wire 7 is melted.

As the temperature increases at the soldering location 4, 5, the solder wire located there first becomes soft and then melts. The counterforce exerted by the end 11 of the solder wire accordingly decreases sharply, and the energy stored in the spring 24 returns the carriage 14 into its initial position again.

As a result of the return of the carriage 14 into its initial position, the signal supplied by the transducer 28 changes toward zero. The resulting detuning of the regulating circuit 29 once again causes the motor 21 to start, which pushes the solder wire 7 forward until the amount of solder which is selected beforehand at the correcting element 47 is reached. It is assumed that the soldering location 4, 5 is heated intensively enough so that the solder wire melts and no resistance causing a displacement of the carriage 14 against the force of the spring 24 opposes its forward feeding.

If the soldering location 4, 5 is intensively heated already before the feed of the solder wire begins, no more force can build up when the end 11 of the solder wire is placed on the soldering location 4, 5. Without special steps, the forward feed system would continue to feed the wire 7 in a controlled manner with respect to speed, since the measurement circuit 38 receives no activation pulse. In order to provide a remedy in such cases, the measurement circuit 38 can be activated already when the motor 21 is switched on. The activation signal for the circuit 38 is preferably supplied by the regulating circuit 29 together with the turn-on signal for the motor 21.

If a contact pressure force, which is registered by the transducer 28, occurs when the end 11 of the solder wire is placed on the soldering location 4, 5, the measurement element 38 reaches the set value of the solder wire amount, which is selected beforehand at the correcting element 47, at a correspondingly later time because of the resulting change of the signal sequence of the tacho-generator 36. This means that the heating required for the soldering process always takes place even when heat is introduced in an unsatisfactory manner.

The soldering device is also particularly suitable for use in automatic soldering stations outfitted with manipulators because of its characteristics described above. For this purpose, the carrier 6 of the soldering device is provided with an adapter plate 39 (FIG. 2) for attaching the soldering device to an extension arm 40 of a manipulator 41 shown in FIG. 3. The end member 42 of the extension arm 40, which is swiveable in the horizontal direction, has a rod 43 which is movable in the vertical direction, the soldering device being fastened to the rod 43. The movements of the extension arm and the rod are stored in a programmable control 44 corresponding to the respective given circumstances. This control can also detect and select predetermined parameters of the soldering device. Thus, it can inquire as to whether or not there is any solder wire available prior to the beginning of a soldering cycle, for example. For this purpose, an electric signal transmitter 45, preferably a light barrier, is arranged at the carriage 14 in the path of the solder wire 7. With the aid of the signal supplied by the light barrier, the control decides whether or not a soldering cycle will be triggered. An additional, preferably optoelectric, signal transmitter 46 which is arranged at the carrier 6 reports to the control 44 as to whether or not a soldering location 4, 5 is located in the soldering position. Moreover, the control 44 can determine the placement force of the end 11 of the solder wire as well as the length of solder wire to be melted via the regulating circuit 29 and can turn on the mechanical drives of the soldering device as well as its measurement value transmitter 28.

These steps ensure an optimal adaptability of the soldering device to soldering locations with different heat, solder quantity, and placement force requirements by a corresponding programming of the control 44. Heating errors are compensated for by the speed of the forward feed of the solder wire. It is particularly significant that bending of even very sensitive solder wires is reliably prevented by means of a regulating of the forward feed of the solder wire in a manner sensitive to force.

While the invention has been illustrated and described with reference to specific embodiments, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of metering a quantity of a solder wire and comprising the steps of:
   actuating an electric motor for driving solder wire feed means supported on a carriage of a solder wire metering device to feed a predetermined length of the solder wire to a soldering location;
   controlling a magnitude of a mechanical feed force applied to the solder wire in proportion to a magnitude of a contact pressure force acting on an end of the solder wire at the soldering location; and
   stopping the electric motor after the predetermined length of the solder wire has been melted at the soldering location.

2. A method according to claim 1, wherein said controlling step includes converting the magnitude of a contact pressure force acting on the end of a solder wire into an electrical signal which is communicated to a regulating circuit for determining a speed of the electric motor for effecting the feed of the solder wire.

3. A method according to claim 2, wherein said controlling step includes changing weighting of said electric signal.

4. A method according to claim 1, further comprising the step of balancing a weight factor of parts of the soldering device which influence the contact pressure force acting on the end of the solder wire, prior to each soldering cycle.

5. A method according to claim 1, further comprising the step of generating a signal for starting measurement of the predetermined length of the solder wire in response to an increase of the contact pressure force acting on an end of the solder wire upon placing the solder wire on a cold soldering location.

6. A method according to claim 5, further comprising the step of measuring the predetermined length of the solder wire by integrating speed proportional signals from the solder wire feed means in response to the increase in the contact pressure acting on the end of the solder wire.

7. A method according to claim 5, wherein said stopping step includes stopping the electric motor when a measurement value has reached a predetermined set value.

8. A device for metering a solder wire of a predetermined length to a solder location, said device comprising a carrier having guide means; a carriage displaceable along said guide means in a direction of feeding of the solder wire; solder wire feed means mounted on said carriage; and spring means extending between said carrier and said carriage for biasing said carriage to a predetermined initial position thereof relative to said carrier and against a contact pressure force applied to an end of the solder wire at a soldering location.

9. A device according to claim 8, further comprising an electric motor for driving said solder wire feed means; a regulating circuit for regulating speed of said electric motor; an electric transducer arranged on said carrier and having a movable member associated with said carriage for generating a signal proportional to a magnitude of displacement of said carriage and communicating said signal to said regulating circuit; and a circuit for balancing said signal which is fed to said regulating circuit.

10. A device according to claim 8, further comprising a rotatable spool mounted on said carriage; and a coil supported on said rotatable spool and on which the solder wire is wound.

11. A device according to claim 8, wherein said carriage includes a solder wire guide, and an electric signal transmitter for sensing presence of the solder wire in said solder wire guide.

12. A device according to claim 11, wherein said electric signal transmitter is formed as a light barrier.

13. A device according to claim 8, further comprising a stop for defining a soldering position of said carriage.

14. A device according to claim 8, wherein said carrier includes an exchangeable holder for supporting a heat source which is aligned with the soldering location.

15. A device according to claim 14, wherein said holder is pivotably mounted on said carrier for movement between a soldering position thereof in which the heat source is aligned with the soldering location, and a cleaning position of said holder.

16. A device according to claim 8, wherein said carrier comprises an adapter for enabling attachment of said device to a tool carrier of a manipulator having a control with a programmable memory.

17. An apparatus comprising a manipulator having a tool carrier; a device according to claim 9 for metering said solder wire; and programmable control means for controlling soldering, said programmable control means being formed to determine a predetermined length of the solder wire to be fed to the soldering location, and to actuate said electric motor and said regulating circuit, said regulating circuit controlling said electric motor in accordance with the pressure contact force acting on the solder wire at the soldering location.

18. A device according to claim 17, further comprising means for sensing presence of at least one of the soldering wire and the soldering location.

19. A device for metering a solder wire and comprising a carriage; solder wire feed means for feeding the solder wire to a soldering location; transmitter means for sensing a contact pressure force acting on an end of the solder wire at the soldering location; an electric motor for driving said solder wire feed means; and a regulating circuit for controlling operation of said electric motor in accordance with the pressure contact force acting on the solder wire at the soldering location.

* * * * *